3,483,418
TRAVELING WAVE TUBE HAVING DAMPING
MEANS BETWEEN THE EXTERNAL INPUT
AND OUTPUT WAVE GUIDES THEREOF
Hannjörg Bittorf, Munich, Hans Denk, Gauting, and Roland Wolfram, Munich, Germany, assignors to Siemens Aktiengesellschaft, Berlin and Munich, a corporation of Germany
Filed May 9, 1967, Ser. No. 637,300
Claims priority, application Germany, May 16, 1966, S 103,835
Int. Cl. H01j 25/34
U.S. Cl. 315—3.5              12 Claims

ABSTRACT OF THE DISCLOSURE

A traveling wave tube with hollow vacuum shell and external input and output wave guides extending laterally with respect to the shell, and operatively connected by a metallic tube surrounding the vacuum shell, in which the inner surface of the metallic tube is interrupted by an electrically dissipative damping material. Materials involved include a mixture of carbonyl iron and epoxide resin, and a mixture of a graphite suspension and $Al_2O_3$ powder.

THE DISCLOSURE

Figure 1:
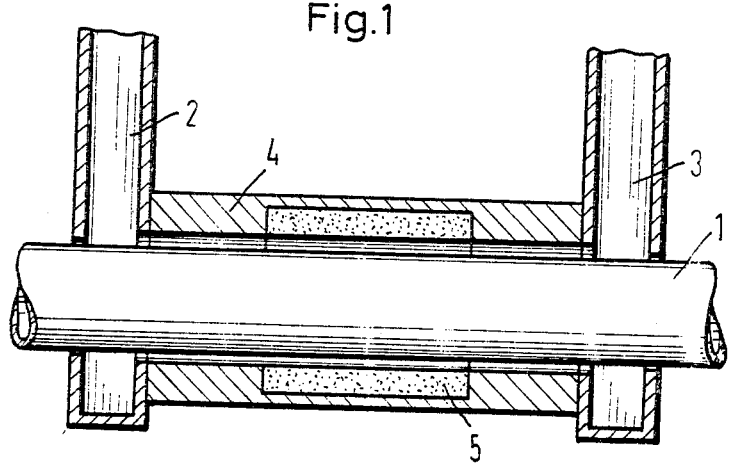

The invention relates to a traveling wave tube with hollow substantially cylindrical vacuum shell and two external wave guides forming the high frequency input and output of the tube, which wave guides extend laterally with respect to the vacuum shell of the tube and are connected with one another in high frequency manner over a metallic tube surrounding the vacuum shell.

Tubes of this type are already known, for example, in German pulished application 1,121,740. Among other things the tube connecting the two external wave guides has the purpose of assuring a good high frequency seal of the tube arrangement with respect to the exterior. In order to avoid a feedback coupling between the two outer wave guides in the operating frequency range of the tube, the metallic connection tube referred to a generally so dimensioned that the lower limiting wave length of the wave guide, which necessarily results from the connection tube, lies above the operating frequencies of the tube. As is a well known fact, the diameter of the metallic tube then cannot exceed a certain value. Consequently, for constructional reasons the lower cutoff frequency of the wave guide, based upon the connection tube, cannot be made arbitrarily high. In particular in the case of traveling wave tubes for the amplification of electromagnetic waves with a frequency of several GHz, it is practically unavoidable that the limiting frequency in question is only slightly higher than the operating frequencies of the tube. Due to these conditions, with regard to interference waves of higher frequency, such a strong feedback coupling exists between the tube output and the tube input that undesired oscillations outside the operating frequency range occur in the tube, extremely impairing the amplifier operation.

In order to overcome the described difficulties, application of a surface resistance onto the vacuum shell of the tube has been tried, for example, by means of a spraying operation. Above all in the case of very short tubes, the resistance values thereby obtainable do not yield a sufficient uncoupling of the tube input and output in the high frequency transmission range of the metallic tube.

It is the purpose of the invention to so construct a traveling wave amplifying tube that in spite of a good high frequency sealing of the amplifier arrangement, undesired disturbing oscillations outside the operating frequency range of the tube are avoided. In order to solve this problem, it is proposed according to the invention in a traveling wave tube of the type initially mentioned, to provide an electrically dissipative damping substance in the conduction path of the metallic tube which interrupts at least the inner surface of the tube.

In the case of a traveling wave tube according to the invention, the damping substance provided in the conduction path of the outer metallic connection tube can, without difficulties, be of sufficient thickness that adequately high damping values are obtainable which assure an effective uncoupling of tube input and output with respect to harmonics. In this case, the damping substance of required thickness can be arranged in a recess in the metallic connection tube. In especially advantageous manner, the damping substance is arranged in the form of a tubular body disposed in a gap which completely severs the metallic connection tube into two sections.

Different resistance materials may be utilized, according to the invention, as a damping body for a traveling wave tube. A preferred type is a damping body which is produced from a mixture of carbonyl iron, graphite and epoxide resin at a weight ratio of approximately 1:1:2 to 5.

Figure 2:
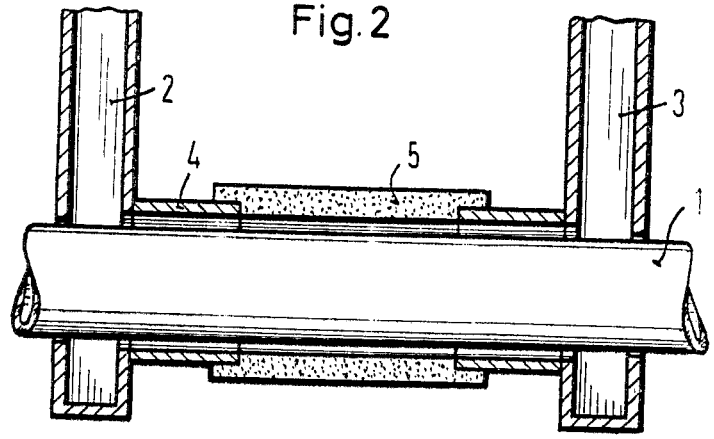

The invention will be explained in greater detail in connection with the examples of construction, illustrated in simple manner, in the figures of the drawing, in which:

FIG. 1 is a longitudinal section of a connecting tube structure embodying the invention; and FIG. 2 is a similar view of another embodiment thereof.

In the figures, all types of the tube that are not necessary for an understanding of the invention have been omitted, such as, for example, the tube end at the cathode side, and the collector of the tube, and corresponding parts have been designated by the same reference symbols.

FIG. 1 illustrates the middle portion of a traveling wave amplifier tube containing a delay line. Two external coupling wave guides 2 and 3 extend laterally with respect to the vacuum shell 1 of the tube, consisting, for example, of dielectric material, which coupling wave guides serve for the conduction of the high frequency energy to and from the tube. In this case, the vacuum shell 1 of the tube extends through the two tubular conductors 2 and 3 which are connected with one another with respect to high frequency over a metallic connecting tube which coaxially encloses the vacuum shell 1. The connecting tube 4 is provided with a centrally disposed recess in which, according to the invention, an electrically dissipative damping material 5 is disposed. In this manner, a high electrical resistance is achieved for the wall currents of electromagnetic waves which can spread in the metallic connecting tube 4, in the form of tubular conductor waves or in the case of a metallic vacuum shell in the form of TEM waves. Consequently, the damping material 5 disposed in the conduction path of the connecting tube 4 effects a decoupling of the two tubular conductors 2 and 4 from one another with respect to high frequency.

Deviating from FIG. 1, the outer metallic connecting tube of a traveling wave tube advantageously can be completely interrupted at the location of the damping material as illustrated in FIG. 2. In this case, the damping material is in the form of a tubular body 5 fitted into the gap interrupting the tube 4. To provide a good mechanical connection between the tube and the damping body 5, the latter is provided at its opposite ends with an enlarged inner diameter approximately equal to the outer diameter of the tube 4, whereby such portions of the damping body overlap the adjacent ends of the metallic tube 4.

The following practical factors come into consideration in connection with the damping material 5. A mixture of a graphite suspension and aluminum powder can be obtained, having a weight ratio of 1 to 1 which is subsequently covered by an insulating lacquer, with a temperature stability of at least up to 100° C. such as, for example, obtainable under the trademark "Glasomax." Such a damping substance, however, exhibits while possessing otherwise satisfactory qualities, only relatively small mechanical stability. Excellent damping qualities have been attained with a damping body of carbonyl iron and epoxide resin at a weight ratio of 5 to 1. Of course, the utilization of such a damping body is limited by the fact that magnetic interferences in the magnetic bunching field of the tube remain within tolerable limits only if a very uniform distribution of the carbonyl iron in the sealing compound is present. Not quite such good damping qualities, but in return a magnetic neutrality are achieved by a damping body of graphite and epoxide resin at a ratio of 1 to 2. Furthermore, the damping material can be produced of graphite, $Al_2O_3$ powder and epoxide resin. A very useful damping material is obtained with carbonyl iron, graphite and epoxide resin at a mixing ratio of approximately 1 to 1 to 2 by weight. In this connection, a damping body produced from the following three components A, B and C has proved to be especially favorable: Component A comprises 80 parts by weight epoxide resin on bisphenol-A- basis, for example, Cy 205 of the Ciba firm, 20 parts by weight cycloaliphatic epoxide resin, for example, Cy 179 of the Ciba firm and 96 parts by weight carbonyl iron; component B comprises 92 parts by weight of an acid-anhydrite hardener, for example, Hy 906 of the Ciba firm and 96 parts by weight graphite, while the third component C comprises 0.4 part by weight of a catalyzer in the form of a tertiary amine, for example, Ciba catalyzer Hy 960.

In all cases in which the resistance value of the damping substance does not quite attain the value required for a completely effective decoupling of the high frequency input and high frequency output of the tube, the vacuum shell of the tube advantageously can be additionally dampened with a surface resistance. The use of this measure is recommended with all of the described damping materials with the exception of a material consisting of carbonyl iron and epoxide resin at a ratio of 5 to 1 which in itself achieves a very high damping.

The invention is not limited to the illustrated examples. In particular the external wave guides need not be tubular conductors, but can also comprise coaxial lines.

Changes may be made within the scope and spirit of the appended claims which define what is believed to be new and desired to have protected by Letters Patent.

We claim:
1. A traveling wave tube with a substantially hollow cylindrical vacuum shell and two external wave guides forming the high frequency input and the high frequency output of the tube, which wave guides extend laterally with respect to the vacuum shell of the tube and are connected with one another in high frequency manner over a metallic tube which surrounds the vacuum shell, characterized in that in the conduction path of the metallic tube an electrically dissipative damping material is disposed which interrupts at least the inner surface of the tube.

2. A traveling wave tube according to claim 1, wherein the metallic tube is completely interrupted at the damping material, the latter being in the form of a tubular body bridging the interrupting gap in the tube.

3. A traveling wave tube according to claim 2, wherein the ends of the metallic tube which bound the gap existing in the metallic tube extend into the end portions of the tubular damping body.

4. A traveling wave tube according to claim 1, wherein the damping material consists of a mixture of carbonyl iron and epoxide resin.

5. A traveling wave tube according to claim 4, wherein the mixing ratio of carbonyl iron to epoxide resin amounts to approximately 5 to 1 in parts by weight.

6. A traveling wave tube according to claim 1, wherein the damping substance is produced from a graphite suspension and $Al_2O_3$ powder with approximately equal parts by weight.

7. A traveling wave tube according to claim 6, wherein the damping material is covered at least on its surface adjacent to the vacuum shell of the tube, with an insulating lacquer heatproof under 100° C.

8. A traveling wave tube according to claim 1, wherein the damping substance consists of a mixture of epoxide resin and graphite at a weight ratio of approximately 2 to 1.

9. A traveling wave tube according to claim 1, wherein the damping substance consists of a mixture of carbonyl iron, graphite and epoxide resin.

10. A traveling wave tube according to claim 9, wherein the parts by weight of carbonyl iron, graphite and epoxide resin are approximately in a ratio of 1:1:2 to 5.

11. A traveling wave tube according to claim 10, wherein the damping material comprises 80 parts by weight epoxide resin on bisphenol-A-basis, 20 parts by weight cycloaliphatic epoxide resin, 92 parts by weight acid-Anydrite-hardener, 96 parts by weight carbonyl iron, 96 parts by weight graphite and 0.4 part by weight of a tertiary amine.

12. A traveling wave tube according to claim 1, wherein the portion of the vacuum shell of the tube disposed in the metallic tube is provided with a damping electrical resistance layer.

References Cited

UNITED STATES PATENTS

| | | | |
|---|---|---|---|
| 2,669,674 | 2/1954 | Diemer | 315—3.5 |
| 2,805,333 | 9/1957 | Waters | 315—3.5 X |
| 2,811,641 | 10/1957 | Birdsall | 315—3.5 X |
| 2,928,058 | 3/1960 | Lagy et al. | 315—3.6 X |
| 2,956,246 | 10/1960 | Duncan | 333—81 X |
| 2,994,008 | 7/1961 | Geiger et al. | 315—3.5 X |

HERMAN KARL SAALBACH, Primary Examiner

S. CHATMON, JR., Assistant Examiner

U.S. Cl. X.R.

315—3.6, 39.3; 333—81